United States Patent [19]
Matsumoto

[11] 3,974,511
[45] Aug. 10, 1976

[54] ELECTRICAL SWITCH ASSEMBLY
[75] Inventor: Toshiaki Matsumoto, Amagasaki, Japan
[73] Assignee: Minolta Camera Kabushiki Kaisha, Osaka, Japan
[22] Filed: Dec. 18, 1974
[21] Appl. No.: 533,751

[30] Foreign Application Priority Data
Dec. 31, 1973 Japan............................ 49-1334[U]

[52] U.S. Cl. ............................................... 354/147
[51] Int. Cl.² ....................................... G03B 15/03
[58] Field of Search ............ 354/147, 146, 246, 242

[56] References Cited
UNITED STATES PATENTS
2,671,390  3/1954  Smith.................................. 354/246
3,833,915  9/1974  Tanaka et al.................... 354/246 X Primary Examiner—L. T. Hix
Assistant Examiner—Alan Mathews
Attorney, Agent, or Firm—Wenderoth, Lind & Ponack

[57] ABSTRACT

An electrical switch assembly for use in a photographic camera of a type having a plane shutter mechanism which is composed of leading and trailing shutter members cooperating to each other to define an exposure opening, through which exposure opening each frame of a photosensitive film is exposed to the incoming light carrying an image of an object to be photographed. The switch assembly comprises a pair of spaced contact members and a carrier lever carrying a pivotable switching lever. The carrier lever is moved from one position to another upon completion of travel of the leading shutter member at which time the switching lever is, if the trailing shutter member has not yet been moved in pursuit of the leading shutter member, pivoted to force one contact member to the other to complete the circuit.

4 Claims, 4 Drawing Figures

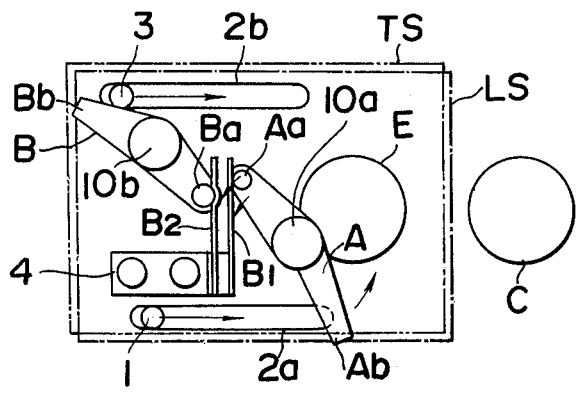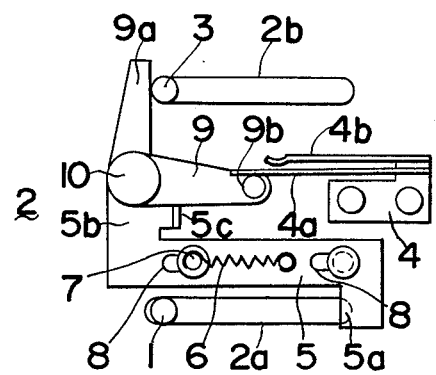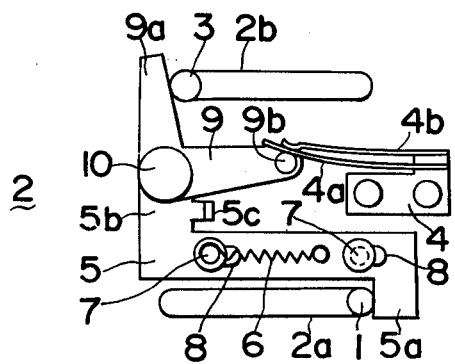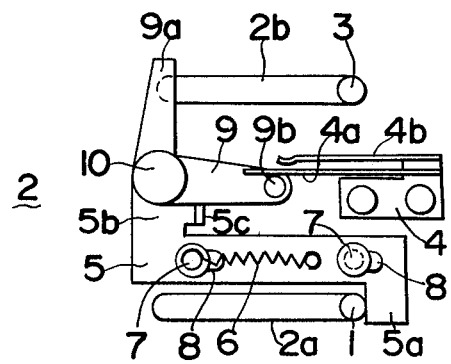

ELECTRICAL SWITCH ASSEMBLY

The present invention relates in general to an electrical switch assembly and, more particularly, to a synchro-switch for use in a photographic camera of a type having a plane shutter mechanism which is composed of leading and trailing shutter members.

In most photographic cameras of the type referred to above, an electrical switch assembly is employed in association with a shutter release mechanism for enabling a flash unit to be energized to illuminate an object to be photographed during operation of the shutter mechanism. This electrical switch assembly is generally referred to as a synchro-switch and is actuated to energize the flash unit only when the width of an exposure slit defined between the leading and trailing sutter members of the shutter mechanism becomes equal to or greater than the width of a frame of a photosensitive film with said exposure slit exactly aligned with said film frame. Heretofore, the electrical switch assembly for this purpose has been composed of a pair of switches electrically connected in series with each other to substantially provide an "AND" logic element inserted in a power supply circuit between the flash unit and a source of electrical power. More particularly, these switches, one being normally opened and the other being normally closed, are associated with the leading and trailing shutter members, respectively, in such a manner that the normally opened switch is closed in response to and upon completion of travel of the leading shutter member while the normally closed switch is opened in response to and upon commencement of travel of the trailing shutter member in pursuit of the leading shutter member. The flash unit is energized only during simultaneous closure of both of the normally opened and closed switches, at which time the whole surface area of the film frame is exposed through the exposure slit to the incoming light carrying an image of the object to be photographed.

The employment of the separate switches requires a relatively complicated electrical wiring and a relatively great number of component parts and, therefore, the reliability of operation thereof is low.

There has recently been proposed a synchro-switch of a construction as shown in FIG. 1 of the accompanying drawings. With reference to FIG. 1, the synchro-switch is substantially composed of a pair of spaced contact members B1 and B2 each in the form of a leaf spring. The contact members B1 and B2 are secured to a fixture 4, which is in turn secured to any suitable foundation, for example, a portion of a camera chassis (not shown), and are spaced from each other as one of the contact members, for example, the contact member B2, tends to bend by its own resiliency while the other contact member tends to extend straight. Either of these contact members B1 and B2, for example, the contact member B2, is formed with a contact point protruding towards the other contact member to facilitate an engagement or contact between the contact members B1 ad B2. The contact members B1 and B2 are operatively associated with leading and trailing shutter blades LS and TS through actuating and releasing levers A and B, respectively.

The actuating lever A, pivotally supported as at 10a to the camera chassis for pivotal movement through a limited angle about the pivot 10a, has one end formed with a pin Aa engageable to the contact member B1 and the other end Ab so positioned as to overlap or overhang one end of a guide slot 2a formed in the camera chassis. On the other hand, the releasing lever B, pivotally supported as at 10b to the camera chassis for pivotal movement through a limited angle about the pivot 10b, has one end formed with a pin Ba and the other end Bb so positioned as to overlap or overhang one end of a guide slot 2b formed in the camera chassis in spaced and parallel relation to the guide slot 2a.

Both the leading and trailing shutter blades LS and TS are mounted for reciprocal sliding movement in guide tracks (not shown) which are provided in the camera chassis as is well known to those skilled in the art. These shutter blades LS and TS are both biased for movement from left to right, as seen in FIG. 1, by a known shutter release mechanism such that, when a shutter release button (not shown) forming a part of the shutter release mechanism is depressed, the leading shutter blade LS first moves from left to right and the trailing shutter blade TS then moved in pursuit of the leading shutter blade LS. The time lag between commencement of movement of the leading shutter blade LS and that of the trailing shutter blade TS depends upon setting of a shutter speed dial or ring. It is to be noted that, in the example shown in FIG. 1, the leading shutter blade LS is shown as having an exposure aperture E which is, when the leading shutter blade LS completes its travel from left to right, aligned with an aperture C, formed in the camera chassis in alignment with an objective lens assembly of the photographic camera, thereby permitting the photosensitive film (not shown) to be exposed to the incoming light before the trailing shutter blade TS subsequently completes its travel from left to right interrupting the passage of the incoming light through the exposure aperture E. As can readily be understood by those skilled in the art, the smaller the time lag, the more the opening of the exposure aperture E is restricted by the trailing shutter blade TS while the leading shutter blade LS is traveling over the aperture C.

While the shutter mechanism functions in the manner as hereinbefore described, the leading and trailing shutter blades LS and TS are provided with follower pins 1 and 3 for movement together with said associated shutter blades LS and TS, said follower pins 1 and 3 being respectively accommodated in said guide slots 2a and 2b. The circuit between the contact members B1 and B2 completes only when the whole surface area of the exposure aperture E is aligned with the aperture C. More particularly, assuming that the shutter release button is depressed, the leading shutter blade LS moves from left to right followed by the trailing shutter blade TS.

At the time the leading shutter blade LS completes its travel from left to right, the follower pin 1 engages the end Ab of the actuating lever A, causing the latter to rotate counterclockwise about the pivot 10a with the pin Aa on the opposite end of the lever A forcing the contact member B1 to contact the contact point on the contact member B2. In this way, the electric circuit between the contact members B1 and B2 completes. Thereafter, by subsequent movement of the trailing shutter blade TS from left to right in pursuit of the leading shutter blade LS, the follower pin 3 disengages from the end Bb of the releasing lever B and the releasing lever B is permitted to rotate about the pivot 10b by the action of the resiliency of the contact member B2, which resiliency of the contact member B2 is transmitted to said lever B through the pin B$a$ on the opposite end of the lever B. Since the contact member B2 tends to bend by its own resiliency, the disengagement of the pin 3 from the end B$b$ of the releasing lever B permits the contact member B2 to bend to assume the neutral position with the contact point disengaging from the contact member B1 so that the circuit between the contact members B1 and B2 is opened.

However, if the trailing shutter member TS is moved shortly after the leading shutter member LS has been moved and before the follower pin 1 engages against the end A$b$ of the lever A, the contact member B2 bends before the contact member B1 engages to the contact point on the contact member B2 and, therefore, the synchro-switch will not be closed.

In the synchro-switch of the construction as hereinbefore described with reference to FIG. 1, since the contact member B2 is forced to extend substantially straight against its own resiliency so long as the shutter mechanism is cocked in readiness for exposure and, on the other hand, since the contact member B1 is also forced to bend against its own resiliency so long as the shutter mechanism is not cocked, the resiliency of both of the contact members B1 and B2 can easily be deteriorated and, in an extreme case, the contact members B1 and B2 will fail to perform a switching action.

Moreover, because of the nature and function of each of the contact members B1 and B2, a relatively large space is required in the photographic camera for the installation of the synchro-switch, which may result in increase of the size of the camera in which the synchro-switch of the construction of FIG. 1 is installed.

Accordingly, an essential object of the present invention is to provide an improved synchro-switch for use in a photographic camera of a type having a plane shutter mechanism, which is constructed with component parts smaller in number than that shown in FIG. 1, with substantial elimination of the above described disadvantages.

Another important object of the present invention is to provide an improved synchro-switch of the type referred to above, which is reliable in operation, which can withstand a relatively long use, which does not require a relatively large space for installation thereof and which can easily be manufactured at a relatively low cost.

According to a preferred embodiment of the present invention, the synchro-switch utilizes a carrier lever normally biased in one direction to an inoperative position and mounted with a substantially L-shaped switching lever having a pair of actuating and releasing arms. A pair of contact members, each in the form of a leaf spring, are supported by a fixture in spaced relation to each other and, irrespective of the shutter mechanism cocked or not cocked, no biasing force is applied to any of the contact members.

The carrier lever can be moved to an operated position in response to and upon completion of travel of the follower pin on the leading shutter member from one end to the other, at which time the L-shaped lever is pivoted by the engagement of the follower pin on the trailing shutter member to the releasing arm of the L-shaped lever so that the contact members are engaged to each other with one of said contact members biased by a pin on the actuating arm of the L-shaped lever.

In the event that the trailing shutter member is moved prior to the carrier lever moved to the operated position, no engagement of the contact members take place and, therefore, the synchro-switch is not closed.

These and other objects and features of the present invention will become apparent from the following description taken in conjunction with a preferred embodiment thereof with reference to the accompanying drawings, in which;

FIG. 1 is a schematic diagram showing a synchro-switch heretofore proposed, the construction of which has already been described above, FIG. 2 is a schematic diagram showing a synchro-switch according to the present invention, said synchro-switch being shown in a condition wherein the shutter mechanism is cocked, FIG. 3 is a similar diagram to FIG. 1, showing the synchro-switch in a condition wherein the leading shutter member has been moved, and FIG. 4 is a similar diagram to FIG. 1, showing the synchro-switch in a condition wherein the shutter mechanism is not cocked, that is, both of the leading and trailing shutter members have been moved.

For the sake of brevity, like parts employed in FIG. 1 and FIGS. 2 to 4 are designated by like reference numerals.

Referring now to FIGS. 2 to 4, the synchro-switch according to the present invention comprises a pair of contact members 4$a$ and 4$b$ supported in spaced relation to each other by a fixture 4 which is in turn secured to the camera chassis. The synchro-switch 2 further comprises a carrier lever 5 supported by the camera chassis for sliding movement between an inoperative position and an operative position in a direction substantially parallel to the direction of movement of both of the leading and trailing shutter members (FIG. 1). For this purpose, the carrier lever 5 has therein a pair of spaced slots 8 through which mounting pins 7 extend from the camera chassis. This carrier lever 5 is of a substantially cornered S-shaped and has a pair of lugs, one on each side of said carrier lever 5, which are respectively indicated by 5$a$ and 5$b$. While the lug 5$a$ is so sized as to overlay one end portion of the guide slot 2$a$ in readiness for engagement with the follower pin 1 on the leading shutter member, the lug 5$b$ carries a substantially L-shaped switching lever 9 pivotally mounted at as 10 to said lug 5$b$.

The switching lever 9 has a releasing arm 9$a$ engageable with the follower pin 3 on the trailing shutter member and an actuating arm terminating substantially below the contact member 4$a$ and having a pin 9$b$ rigidly mounted thereon. A stop 5$c$ is integrally formed on the lug 5$b$ adjacent the body of the carrier lever 5, said stop 5$c$ being so positioned as to permit the pin 9$b$ to substantially contact the contact member 4$a$ without applying any biasing force to said contact member 4$a$.

The carrier lever 5 is normally biased to the inoperative position by a tension spring 6 suspended between a portion of said lever 5 and one of the mounting pins 7. It is to be noted that the free end of the releasing arm 9$a$ of the switching lever 9 is, when the carrier lever 5 is biased to the operative position and the actuating arm rests on the stop 5$c$, positioned adjacent one end extremity of the guide slot 2$b$.

The synchro-switch 2 according to the present invention being constructed in the manner as hereinbefore described, it functions as follows.

Assuming that the shutter mechanism of the photographic camera is cocked, the various components of the synchro-switch assume respective positions as shown in FIG. 2. Subsequent depression of the shutter release button in the camera first causes the leading shutter member to move from left to right and then causes the trailing shutter member to move in pursuit of the leading shutter member, as is well understood by those skilled in the art. Again assuming that there is a sufficient time lag of, for example, 1/60 second or more, between commencement of movement of the leading shutter member from left to right and that of the trailing shutter member, the synchro-switch 2 operates in the sequence shown in FIGS. 2 to 4. In other words, at the time of completion of movement of the leading shutter member to the right position as shown in FIG. 3, the carrier lever 5 has been moved to the right against the tension spring 6 with the follower pin 1 on the leading shutter member engaging against the lug 5a of said carrier lever 5. At this time, the exposure aperture E in the leading shutter member is fully aligned with the aperture C to allow the incoming light carrying the image of the object to be photographed to reach one frame of the photosensitive film as has been described with reference to FIG. 1.

Simultaneously with movement of the carrier lever 5 against the tension spring 6, the switching lever 9 commences to rotate counterclockwise about the pivot 10 with the releasing arm 9a being restrained by the follower pin 3 on the trailing shutter member. As the switching lever 9 pivots in this way, the pin 9b on the actuating arm of the switching lever 9 is substantially upwardly lifted, thereby pressing the contact member 4a towards the contact member 4b to complete the circuit between these contact members 4a and 4b.

Shortly thereafter, the trailing shutter member moves from left to right together with the follower pin 3 disengaging from the releasing arm 9a of the switching lever 9. Upon disengagement of the follower pin 3 from the releasing arm 9a of the switching lever 9, the latter commences to rotate clockwise about the pivot 10. This is possible because, at the time the switch has completed, closure of the contact members 4a and 4b, at least one contact member 4a is deformed to engage the contact member 4b accumulating resilient force necessary for causing the contact member 4a to return to the original position, which resilient force acts on the switching lever 9 through the pin 9b to so pivot said switching lever 9 upon disengagement of the follower pin 3 from the releasing arm 9a. In this way, the contact member 4a that has been engaged with the contact member 4b disengages therefrom, thereby opening the synchro-switch 2. The condition wherein the synchro-switch 2 is opened and the shutter mechanism has not yet been cocked is shown in FIG. 4.

On the other hand, if the above described time lag is insufficient, for example, less than 1/60 second, which means that the shutter speed is higher than the value at which the flash unit can be synchronized with the camera shutter mechanism, the trailing shutter member commences to move from left to right prior to completion of travel of the leading shutter member and, therefore, before the carrier lever 5 is moved to the operative position against the tension spring 6, the follower pin 3 moves away from the releasing arm 9a of the switching lever 9 without causing the latter to rotate about the pivot 10. Accordingly, the synchro-switch 2 cannot be closed.

From the foregoing full description of the present invention, it has now become clear that the number of component parts of the synchro-switch the physical characteristics of which may deteriorate is relatively small and, therefore, the synchro-switch according to the present invention exhibits a reliable performance for a substantially long period of time.

It is to be noted that various changes and modifications will be apparent to those skilled in the art. For example, the leading and trailing shutter members described above may be either a blade or a curtain. Moreover, although the leading shutter member has been described as having an exposure aperture, the present invention can equally be applicable with a shutter mechanism of a variable-width slit wherein the slit corresponding in function to the exposure aperture is formed between the rear end of the leading shutter member and the front end of the trailing shutter member. Furthermore, the tension spring 6 may not be always necessary. Even if this tension spring is omitted, the carrier lever 5 can be returned to the inoperative position as the shutter mechanism is cocked, should the contact member 4a has a sufficient resiliency. Therefore, these changes and modifications should be understood as included within the true scope of the present invention unless they depart therefrom.

What I claim is:

1. A synchro-switch for use in a photographic camera of a type having leading and trailing shutter members constituting a plane shutter mechanism, said leading and trailing shutter members cooperating with each other to define an exposure opening through which each frame of a photosensitive film loaded in the camera is exposed to the incoming light carrying an image of an object to be photographed, said synchro-switch comprising:

a pair of contact members stationarily supported in position in spaced relation to each other;

first and second members respectively associated with said leading and trailing shutter members for movement together therewith;

a plate member supported in position for sliding movement between an inoperative and an operative position, said plate member being moved from said inoperative position to said operative position by said first member upon completion of movement of said first member from one position to another; and a substantially L-shaped lever having a releasing arm and an actuating arm and pivotally mounted on said plate member, said L-shaped lever engaging said second member and pivoting, as said plate member is moved towards the operative position and if the trailing shutter member has not yet been moved in pursuit of said leading shutter member, to cause said actuating arm to press one of the contact members into contact with the other contact member to complete a circuit while said releasing arm is restrained by said second member associated with said trailing shutter member, and when said trailing shutter member is moved prior to the plate member being moved to the operative position, the second member moving out of the path of said L-shaped lever so that said L-shaped lever is not pivoted and said contact members are not pressed into contact.

2. A synchro-switch as claimed in claim 1, wherein there is further provided a spring element connected to said member for biasing said plate member to said inoperative position.

3. A synchro-switch is claimed in claim 1, wherein there is further provided a stop in the path of movement of said L-shaped lever for restricting pivotal movement of said L-shaped lever.

4. A synchro-switch as claimed in claim 1, wherein there is further provided a spring element connected to said plate member for biasing said plate member to said inoperative position.

* * * * *